Aug. 2, 1966  F. A. PACHMAYR  3,263,359
REINFORCED FIREARM RECOIL PAD
Filed Aug. 2, 1965
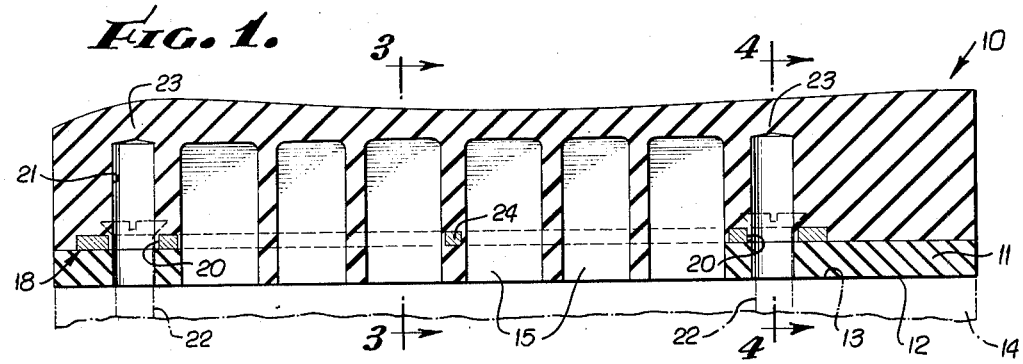
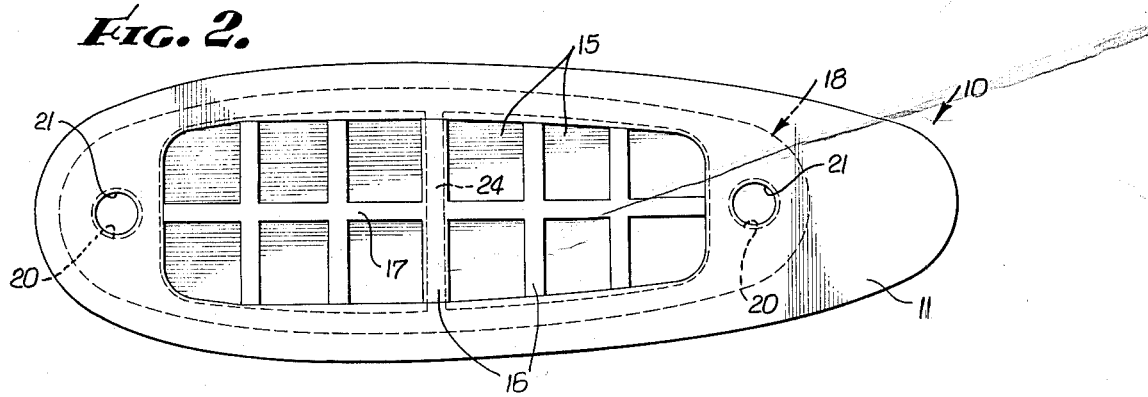
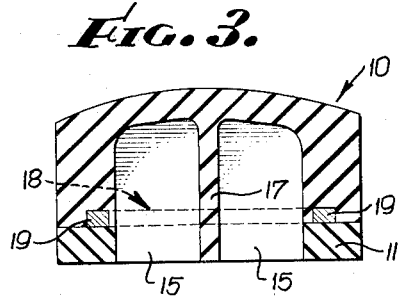
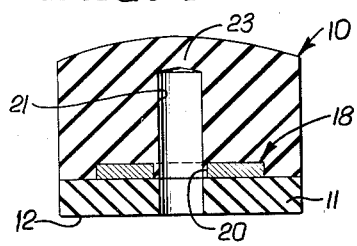
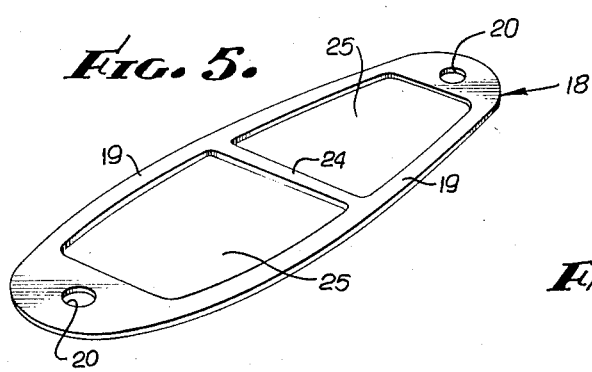
INVENTOR.
FRANK A. PACHMAYR
By White & Haefliger
ATTORNEYS.

United States Patent Office 3,263,359
Patented August 2, 1966

3,263,359
REINFORCED FIREARM RECOIL PAD
Frank A. Pachmayr, 1220 S. Grand Ave.,
Los Angeles, Calif. 90015
Filed Aug. 2, 1965, Ser. No. 476,589
7 Claims. (Cl. 42—74)

This inveniton has to do generally with improvements in firearm recoil pads of the known type comprising an elongated rubber body applicable to and peripherally shaped in accordance with the end face of the conventional gun stock. More particularly, the invention is directed to improvements in internal reinforcement for such pads, and specifically with respect to a novel and simplified form of metallic plate insert which serves the dual functions of reinforcing the body of the pad and providing for attachment of the pad to the gun stock.

Heretofore it has been a practice to reinforce a rubber recoil pad body by embedding and molding therein a reinforcement plate which parallels the pad-stock interface and is spaced therefrom in the rubber to allow for pad compression against the stock and screwed thereto. Also it has been known to shape the reinforcement plate with an open center area which may extend about a corresponding central portion of the pad wherein the rubber is molded to form recesses or cavities which enhance the recoil cushioning effect of the pad. In the interests of lending strength and rigidity to the reinforcement plates, the latter have been formed in configurations, which though effective, have entailed added manufacturing costs which the present invention aims to obviate in favor of a more economical but desirably practicable form.

In accordance with the invention, the present reinforcement plate is reduced to the simple form of an essentially flat plate which is centrally open to extend about the recessed cushioning area of the rubber body and is reinforced against spreading or other distortion of the side extents of the plate by a simply formed integral rib or web extending between the sides and which, as will appear, may be embedded by molding within a transverse internal rib portion of the pad. Thus the reinforcement plate may be made as a simple stamping readily adaptable for easy molding inside the pad body to effectively support and reinforce the latter under all normal conditions of usage.

The invention will be fully understood from the following detailed description of an illustrative embodiment shown by the accompanying drawings in which:

FIG. 1 is a longitudinal cross section taken centrally through the pad;

FIG. 2 is a view showing in elevation the inside of the stock-contacting face of the pad;

FIGS. 3 and 4 are cross sections taken respectively on lines 3—3 and 4—4 of FIG. 1; and FIG. 5 is a view showing the reinforcement plate in perspective.

The pad body generally indicated at 10 is molded of rubber and may or may not include an integrally molded harder rubber layer or lamination 11 forming the interface 12 of the pad for engagement against the end surface 13 of the gun stock 14. As will be understood, the pad body is peripherally shaped in conformance with the shape of the stock surface 13. Body 10 is shown to contain a central cushioning area formed by cavities or recesses 15 defined by intersecting transverse webs 16 and a longitudinal web 17.

The reinforcement plate 18 may be stamped out of suitable sheet metal stock to be essentially flat, although if desired the side extents 19 of the plate may be given slight curvature for added strength. The plate 18 is molded within the pad body in spaced parallel relation with the interior surface 12 of the pad, as for example where the pad has a lamination 11, by applying the plate to the inner surface of the lamination and then molding the rubber body of the pad to bondage with both the lamination and plate. The latter is shown to have apertures 20 alined with closed end holes 21 in the pad body to receive screws 22 for attachment to the gun stock 14. The screws may be inserted by thrusting them through the body rubber appearing at 23 above the holes 21, and the screws then may be turned into the gun stock by drivers inserted through the screw-formed openings of the rubber until the screw heads, which deform or spread the rubber along the walls of holes 21, become tightened against the plate 18.

The plate 18 is reinforced by an integrally formed transverse rib or web 24 located at substantially the longitudinal center of the open area 25 of the plate, the web serving to rigidly interconnect at side extents 19 of the plate to prevent their spreading or other distortion.

As embedded in the rubber body of the pad, the sides 19 and ends of the reinforcement plate extend about all the cavities 15 as shown in FIGS. 1 and 2. The web 24 preferably is given somewhat lesser width than the pad web 16a so that the plate web may become embedded and fully concealed therein.

Thus the reinforcement plate adapts itself to easy accommodation and embedding in the course of molding the pad, and to concealment of the transverse web within the body rubber.

I claim:

1. A firearm recoil pad comprising an elongated rubber body having an inner face applicable to and having peripheral shape conformance with the end surface of a gun stock, and an elongated metallic reinforcing plate embedded in the body in spaced parallel relation with its inner face and attachable to the gun stock, said plate having a central elongated open area and an integral rib transversely bridging said area.

2. A pad according to claim 1, in which said rib is embedded in the body at about the longitudinal center of the pad.

3. A firearm recoil pad comprising an elongated rubber body having an inner face applicable to and having peripheral shape conformance with the end surface of a gun stock, said inner face of the body having a central area containing recesses separated by webs molded integrally with the pad body, and an elongated metallic reinforcing plate embedded in the body in spaced parallel relation to its inner face and surrounding said recesses, said plate being attachable to the gun stock and centrally open in the body recess area, the plate having an integrally formed transverse rib bridging the plate opening within said area.

4. A pad according to claim 3, in which said rib is embedded in the body rubber.

5. A pad according to claim 3 in which one of said webs extends transversely of the body and said rib is embedded in said transverse web.

6. A pad according to claim 5, in which said rib is located substantially at the longitudinal center of the pad body and plate.

7. A pad according to claim 6, in which the pad body comprises bonded lamination means one surface of which forms said inner face of the pad, said reinforcement plate being engaged against the opposite surface of said lamination means inside the pad.

No references cited.

BENJAMIN A. BORCHELT, *Primary Examiner.*